United States Patent [19]

Karasudani

[11] 4,220,224

[45] Sep. 2, 1980

[54] DISC BRAKE

[75] Inventor: Yasuo Karasudani, Yokohama, Japan

[73] Assignee: Tokico Ltd., Kawasaki, Japan

[21] Appl. No.: 972,486

[22] Filed: Dec. 22, 1978

[30] Foreign Application Priority Data

Jan. 5, 1978 [JP] Japan .................................. 53-335

[51] Int. Cl.$^2$ ............................................. F16D 65/02
[52] U.S. Cl. ............................ 188/73.3; 188/218 XL
[58] Field of Search .................... 188/18 A, 71.1, 72.4,
188/72.5, 73.3–73.5, 218 XL

[56] References Cited

U.S. PATENT DOCUMENTS 3,499,508  3/1970  Swift .................................... 188/73.4

Primary Examiner—Duane A. Reger
Attorney, Agent, or Firm—Wenderoth, Lind & Ponack

[57] ABSTRACT

A disc brake of the type including a pair of friction pads mounted on opposite sides of a rotatable disc, a stationary supporting member supporting the friction pads for directly receiving the braking torque from the friction pads, and a caliper supported on the supporting member and being slidable thereon for applying the friction pads against the opposite sides of the disc. The supporting member has a pair of arm portions spaced in the direction of the circumference of the disc and straddling respectively the disc for supporting and guiding the friction pads, a mounting portion disposed at one side of the disc and adapted to be mounted on a non-rotatable part of a vehicle and extending between the arm portions, and a beam portion interconnecting the arm portions and extending in a circumferential groove formed in the outer circumference of the disc.

3 Claims, 3 Drawing Figures

DISC BRAKE

BACKGROUND OF THE INVENTION

This invention relates to a disc brake and, more particularly to a disc brake of the type including a pair of friction pads mounted on opposite sides of a rotatable disc, a stationary supporting member supporting and guiding the friction pads and directly receiving the braking torque from the friction pads during application of the brake, and a caliper supported on the supporting member and being slidable thereon during application of the brake.

Usually, the stationary supporting member comprises a pair of arm portions spaced from one another in the direction of the circumference of the disc and each of which straddles a portion of the periphery of the disc, and a mounting portion disposed on one side of the disc and connecting the arm portions and being adapted to be mounted on a non-rotatable part of a vehicle. It has been proposed for increasing the strength and rigidity of the arm portions, to provide a beam portion on the other side of the disc and interconnecting the arm portions. However there are shortcomings to such an arrangement such that it is sometimes difficult to mount the disc brake on a vehicle since the beam portion usually extends along the backside of adjacent friction pads or on the axially outer side of the caliper thereby occupying additional space, and causing an interference with a vehicle body.

BRIEF SUMMARY OF THE INVENTION

An object of the present invention is to improve the prior art disc brake of the above described type.

According to the present invention, the beam portion interconnecting the arm portions is fitted in and extends along a circumferential groove or recess formed in the outer circumference of the disc with a clearance provided therebetween. Thus, the axial length of the disc brake can be minimized, and the strength and the rigidity of the arm portions can be assured.

BRIEF DESCRIPTION OF THE DRAWINGS

These and other advantages of the present invention are hereinafter set forth and explained with reference to the drawings, in which.

Figure 1:
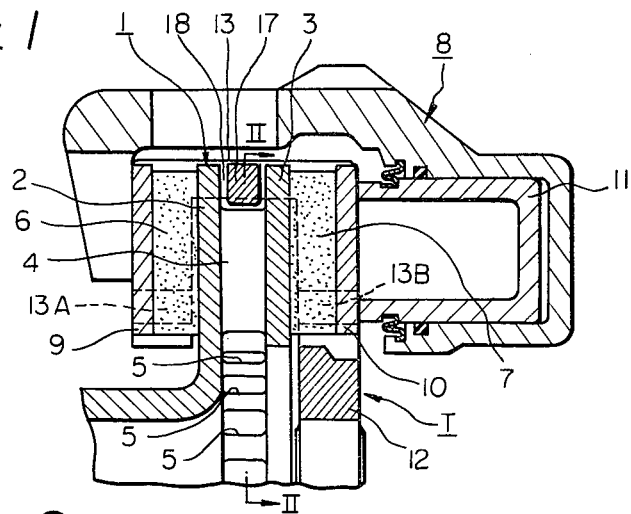
FIG. 1 is a longitudinal sectional view of a disc brake of the present invention.
Figure 2:
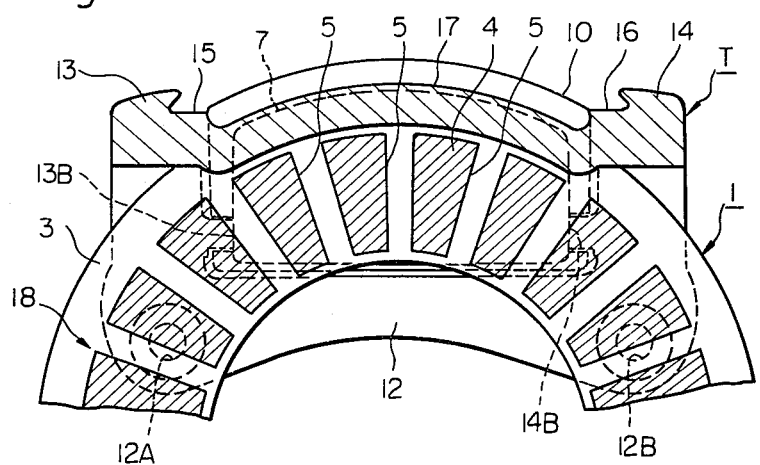
FIG. 2 is a cross-sectional view taken along line II—II in FIG. 1, but the caliper is omitted.
Figure 3:
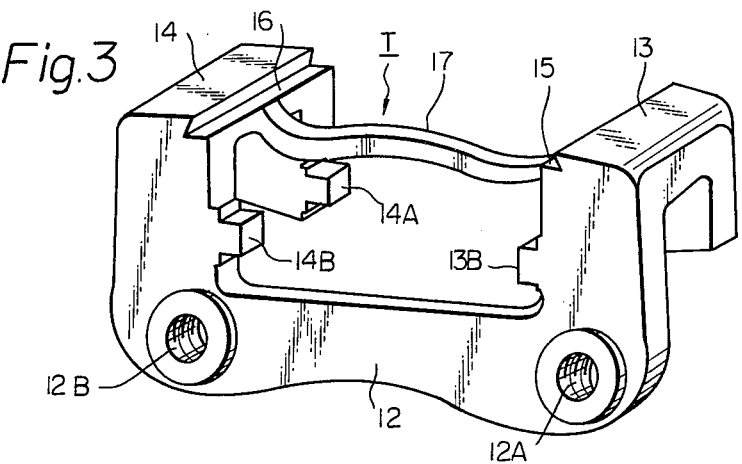
FIG. 3 is a perspective view of the stationary supporting member.

The disc brake shown in the drawings is adapted to cooperate with a rotatable disc 1. The disc 1 is a so-called ventilated type and comprises two disc plates 2 and 3 spaced from each other integrally connected by an annular intermediate member 4, the plates 2 and 3 and member 4 together defining a peripheral groove 18 around the periphery of the disc 1. The member 4 has a plurality of ventilating passages 5 formed therein extending in the radial directions with respect to the axis of the disc 1.

A pair of friction pads 6 and 7 are mounted on the opposite sides of the disc 1 and are adapted to be applied to the disc 1 by means of a caliper 8 of the floating type which straddles a portion of the outer circumference of the disc 1 and has a piston 11 incorporated therein.

On one side of the disc 1, i.e. the side where the piston 11 of the caliper 8 is located, a mounting portion 12 of a stationary supporting member T is provided for being secured to a non-rotatable part of a vehicle (not shown) by two bolts (not shown) screwthreadingly engaging in threaded bores 12A and 12B. A pair of arm portions 13 and 14 straddling the disc 1 are integral with the mounting portion 12. The arm portions 13 and 14 are spaced in the direction of the circumference of the disc and respectively have projecting portions 13A and 13B, and 14A and 14B on the opposed sides thereof for slidably supporting backing plates 9 and 10 for the friction pads 6 and 7 and receiving braking torque generated in the friction pads 6 and 7 during application of the brake. The caliper 8 is slidably guided in grooves 15 and 16 formed in the upper portion of the arm portions 13 and 14 and is movable in the direction of the axis of the disc 1. Alternatively, the caliper may be slidably supported on the supporting member T by means of pins secured to the caliper and slidably received in corresponding bores formed respectively in the arm portions 13 and 14.

The supporting member T further comprises, according to the present invention, a beam portion 17 integrally connecting the arm portions 13 and 14, and the beam portion 17 extends within the circumferential recess or groove 18 formed in the outer circumference of the disc 1 and a clearance is left between the beam portion 17 and the sides and bottom of the groove 18. Thus, the supporting member T has a frame structure constituted by the beam portion 17, a portion of each of the arm portions 13 and 14 and the mounting portion 12, and the frame structure is effective to prevent the bending deformation of the arm portions 13 and 14 which would be caused by the braking torque acting on the friction pads 6 and 7 during application of the brake, whereby, non-uniform wear of the friction pads 6 and 7 can be prevented. According to the present invention, the beam portion 17 connects the intermediate portions of respective arm portions 13 and 14, whereby the rigidity of the aforesaid frame structure is increased and the strength of the supporting member T is increased.

Further, the beam portion 17 according to the invention is disposed in the groove 18 formed in the outer circumference of the disc 1, so that the beam portion is not disposed on the backside of the friction pad 6 and the disc brake can easily be mounted on the vehicle. Further, since the beam portion does not project radially outwards of the outer circumference of the disc, the size of the caliper can be minimized. Therefore, it is possible to increase the strength and the rigidity of the supporting member without increasing the overall dimensions of the supporting member.

What is claimed is:

1. A disc brake comprising a rotatable disc having a circumferential groove in the periphery thereof, a pair of friction pads disposed on opposite sides of said disc, a stationary supporting member having a pair of arm portions spaced from each other in the direction of the circumference of said disc, said arm portions extending respectively in the direction of the axis of the disc and straddling the periphery of the disc, said friction pads being slidably mounted on said arm portions, a caliper slidably mounted on the stationary member, a beam integral with the stationary member rigidly interconnecting said arm portions, at least a portion of said beam being within said circumferential groove in the periphery of the disc with a clearance between said beam and the inner surfaces of said groove.

2. A disc as claimed in claim 1, wherein said disc comprises two annular parallel plates, and an annular intermediate member interconnecting said annular plates and having a plurality of generally radial passages therein, said circumferential groove being defined between said annular plates and radially outwards of said intermediate member.

3. A disc brake as claimed in claim 2, wherein at least a portion of said beam in the lengthwise direction thereof is completely within said circumferential groove.

* * * * *